(12) United States Patent
Kurashige (10) Patent No.: US 8,537,445 B2
(45) Date of Patent: Sep. 17, 2013

(54) TRANSMISSION TYPE OPTICAL ELEMENT AND ANTI-FORGERY VOLUME HOLOGRAM

(75) Inventor: Makio Kurashige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/527,038

(22) Filed: Jun. 19, 2012

(65) Prior Publication Data

US 2012/0257266 A1  Oct. 11, 2012

Related U.S. Application Data

(62) Division of application No. 12/538,533, filed on Aug. 10, 2009, now Pat. No. 8,228,576.

(30) Foreign Application Priority Data

Aug. 11, 2008 (JP) ................................. 2008-206794
Aug. 11, 2008 (JP) ................................. 2008-206795

(51) Int. Cl.
*G02B 5/32* (2006.01)
*G03H 1/00* (2006.01)

(52) U.S. Cl.
USPC .................................................. 359/15; 359/2

(58) Field of Classification Search
USPC ......................................................... 359/2, 15
See application file for complete search history.

(56) References Cited

U.S. PATENT DOCUMENTS 5,071,210 A   12/1991   Arnold et al.

FOREIGN PATENT DOCUMENTS

| JP | 5-16726 A | 1/1993 |
| JP | 08-123305 A | 5/1996 |
| JP | 2003-161820 A | 6/2003 |
| JP | 2004-061731 A | 2/2004 |

OTHER PUBLICATIONS

Japanese Office Action dated Apr. 8, 2012.

*Primary Examiner* — Alessandro Amari
(74) *Attorney, Agent, or Firm* — Sughrue Mion, PLLC (57) ABSTRACT

A transmission type optical element comprising a first hologram having a first surface and a second surfaces and a second hologram having a third surface and a fourth surface. The first surface of the first hologram and the third surface of the second hologram are oppositely arranged. A first light beam having a first wavelength is made to enter the first hologram from the side of the second surface. It is transmitted through the first hologram and exits the first hologram from the side of the first surface. The light beam then enters the second hologram from the side of the third surface. It is diffracted by the second hologram and exits the second hologram from the side of the third surface. The light beam then enters the first hologram from the side of the first surface and is diffracted by the first hologram.

2 Claims, 9 Drawing Sheets

PRIOR ART

TRANSMISSION TYPE OPTICAL ELEMENT AND ANTI-FORGERY VOLUME HOLOGRAM

CROSS REFERENCE TO RELATED APPLICATIONS

This is a divisional of U.S. patent application Ser. No. 12/538,533, filed on Aug. 10, 2009, which claims priority from Japanese Patent Application Nos. 2008-206794 and 2008-206795 filed in Japan on Aug. 11, 2008, the entire contents of which are incorporated herein by this reference.

BACKGROUND OF THE INVENTION

1. Field of the Invention

The present invention relates to a transmission type element having first and second holograms that are Lippmann holograms and having wavelength selectivity and also to a transmission observation type anti-forgery volume hologram having wavelength selectivity that is particularly suitable for forgery prevention.

2. Description of the Related Technology

Figure 14:
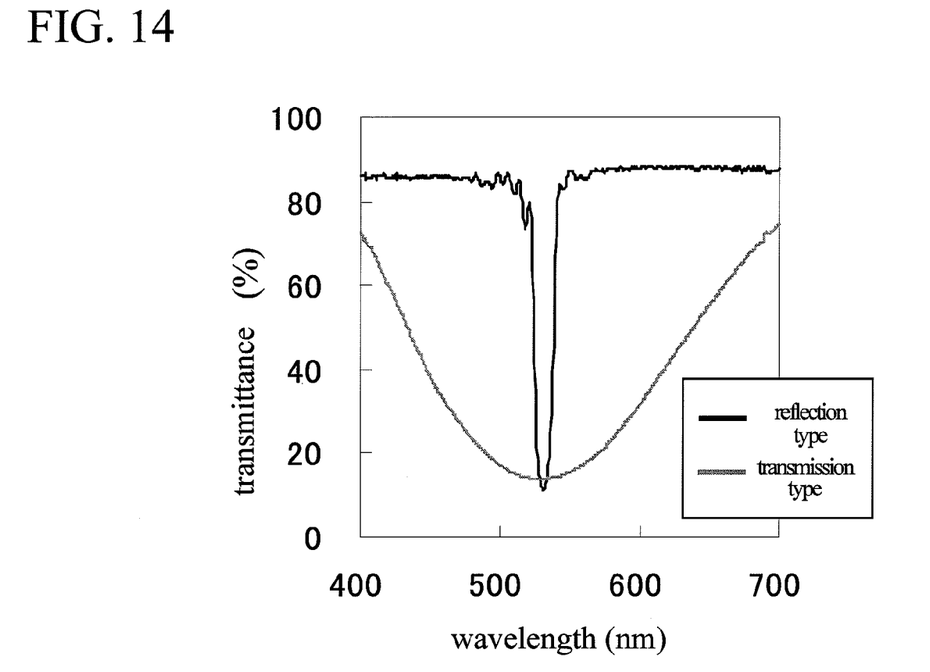
FIG. 14 is a schematic illustration of the spectral transmittance distribution of a reflection type hologram and that of a transmission type hologram.

As general characteristics of holograms, it is known that Lippmann holograms (volume and reflection type holograms) have a high-angle selectivity and high-wavelength selectivity while transmission type holograms (volume type/surface relief type) give rise to color dispersion to a large extent. FIG. 14 is a schematic illustration of the spectral transmittance distribution of a reflection type hologram and that of a transmission type hologram. As illustrated in FIG. 14, reflection type holograms have high-wavelength selectivity whereas transmission type holograms have low-wavelength selectivity.

Holography is a technique of recording both the amplitude and the phase of a light into photosensitive material as interference fringe between reference and object light. While ordinary photography can provide only an image observed from a single angle of view, a hologram prepared by means of this technique can reproduce a three dimensional image obtained by observing an object from different angles of view. A hologram requires a sophisticated technique for preparation and also an apparatus that is sophisticated and costly. Therefore, it is generally difficult to forge or alter a hologram and hence attempts are being made to use holograms as anti-forgery means for certificates and securities, exploiting the difficulty of forgery of holograms.

While a sophisticated optical design technique and costly equipment are required to copy a hologram, it is possible to copy a hologram by contact copy method, which photosensitive material is stacked on master hologram, and light for recording enters from photosensitive material side in case of a reflection type hologram and from master hologram side in case of a transmission type hologram. For example, it has been proposed to prevent copying a hologram for the purpose of forgery by dividing a hologram into element regions and varying the angle of reference light for each region (see Patent Document 2: JP-A-08-123305).

An invention relating to an image combiner for using a reflection type hologram in the inside of an element and making light from an image display means and external light overlap each other has been disclosed (Patent Document 1: JP-A-2004-061731).

However, it is difficult to use the above-described arrangement for synthesis/separation of light. Light has to enter from the edge of light guide because of adapting total reflection, so area of incident light is limited by the area of edge of light guide, that results in decrease of total amount of light and difficulty in case of applications that needs wide area of incident light.

Additionally, when a transmission type hologram is used as an optical element, light other than the designed wavelength is also diffracted because of low wavelength selectivity, that gives rise to trouble when used for synthesis/separation of a light path in certain applications.

In view of the above-identified problems of the conventional technology, the object of the present invention is to provide a transmission type optical element having excellent wavelength selectivity and a transmission type anti-forgery volume hologram that is not costly and structurally simple but has excellent wavelength selectivity and is difficult to be forged.

SUMMARY OF THE INVENTION

According to the present invention, the above object is achieved by providing a transmission type optical element including: a first hologram having a first surface and a second surface; and a second hologram having a third surface and a fourth surface; the first surface of the first hologram and the third surface of the second hologram being oppositely disposed; wherein a first light beam having a first wavelength is made to enter the first hologram from the side of the second surface, be transmitted through the first hologram, exit the first hologram from the side of the first surface, enter the second hologram from the side of the third surface, be diffracted by the second hologram, exit the second hologram from the side of the third surface, enter the first hologram from the side of the first surface, be diffracted by the first hologram, exit the first hologram from the side of the first surface, enter the second hologram from the side of the third surface, be transmitted through the second hologram and exit the second hologram from the side of the fourth surface.

Preferably, a transmission type optical element according to the present invention as defined above is characterized in that a second light beam having a second wavelength different from the first wavelength is made to enter the first hologram from the side of the second surface, to be transmitted through the first hologram, exit the first hologram from the side of the first surface, enters the second hologram from the side of the third surface, to be transmitted through the second hologram and exit the second hologram from the side of the fourth surface.

Preferably, a transmission type optical element according to the present invention as defined above is characterized in that the first light beam and the second light beam represent different exit angles to the second hologram when they represent a same incident angle to the first hologram.

Preferably, a transmission type optical element according to the present invention as defined above is characterized in that the first light beam and the second light beam represent different incident angles to the first hologram when they represent a same exit angle to the second hologram.

In another aspect of the present invention, the above object is achieved by providing a transmission type anti-forgery volume hologram having wavelength selectivity, including: a first hologram that is a Lippmann hologram having a first surface and a second surface; and a second hologram that is a Lippmann hologram having a third surface and a fourth surface; the first surface of the first hologram and the third surface of the second hologram being oppositely disposed; wherein a first light beam having a first wavelength is made to enter the first hologram from the side of the second surface, be transmitted through the first hologram, exit the first hologram from the side of the first surface, enter the second hologram from the side of the third surface, be diffracted by the second hologram, exit the second hologram from the side of the third surface, enter the first hologram from the side of the first surface, be diffracted by the first hologram, exit first hologram from the side of the first surface, enter the second hologram from the side of the third surface, be transmitted through the second hologram and exit the second hologram from the side of the fourth surface, that a second light beam having a second wavelength different from the first wavelength is made to enter the first hologram from the side of the second surface, to be transmitted through the first hologram, exit the first hologram from the side of the first surface, enters the second hologram from the side of the third surface, to be transmitted through the second hologram and exit the second hologram from the side of the fourth surface and that the first light beam and the second light beam represent different exit angles to the second hologram when they represent a same incidence angle to the first hologram.

Thus, according to the present invention, it is possible to provide a compact transmission type optical element that is not costly and structurally simple but has excellent wavelength selectivity.

Additionally, according to the present invention, it is possible to provide a compact anti-forgery volume hologram that is not costly and structurally simple but has excellent wavelength selectivity and is difficult to be forged.

Still other objects and advantages of the invention will in part be obvious and will in part be apparent from the specification.

The invention accordingly includes the features of construction, combinations of elements and arrangement of parts which will be exemplified in the construction hereafter set fourth and the scope of the invention will be indicated in the claims.

DESCRIPTION OF EXEMPLARY EMBODIMENTS

Now, an embodiment of transmission type optical element according to the present invention that has excellent wavelength selectivity and also an embodiment of volume hologram according to the present invention that is not costly and structurally simple but has excellent wavelength selectivity and is difficult to be forged will be described below by referring to the accompanying drawings.

A transmission type optical element 10 or an anti-forgery volume hologram 10 according to the present invention that is provided with wavelength selectivity includes two Lippmann holograms that are oppositely arranged. A first hologram 1' that is prepared in a marnier as illustrated in FIG. 1 and a second hologram 2' that will be described hereinafter are employed as Lippmann holograms.

To prepare a transmission type optical element 10 or an anti-forgery volume hologram 10 of this embodiment, firstly a first hologram that is a prerequisite is prepared. FIG. 1 is a schematic illustration of a method of preparing a first hologram 1'.

Figure 1:
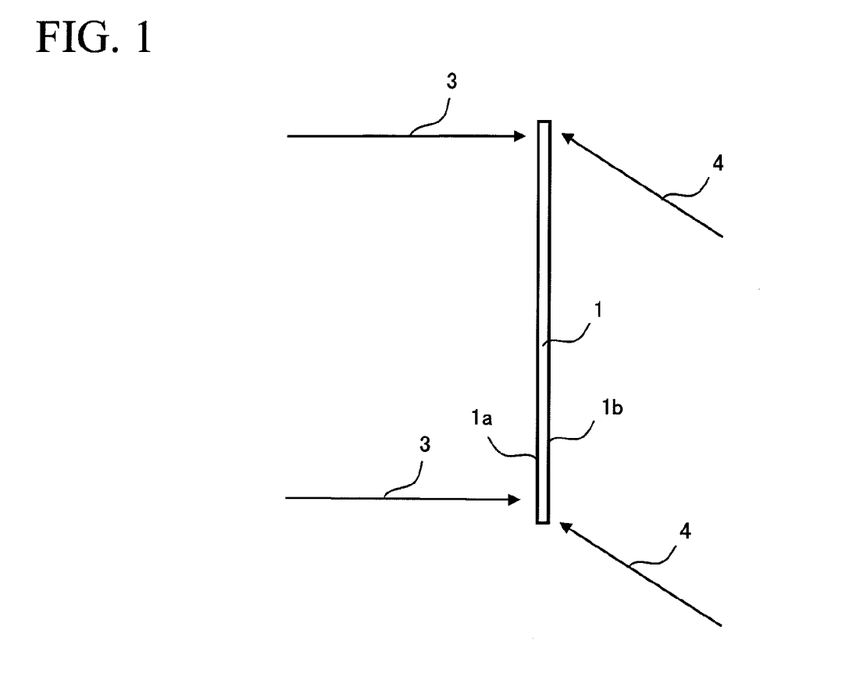
FIG. 1 is a schematic illustration of a method of preparing a first hologram 1'.

Firstly, as illustrated in FIG. 1, a first object light beam 3 having a first wavelength is made to enter a first photosensitive material 1 for recording hologram 1', which may be a photopolymer or a silver halide material, at a predetermined incident angle from the side of a first surface 1a. At the same time, a first reference light beam 4 having a first wavelength that is emitted from a light source same as that of the first object light beam 3 and collimated or substantially collimated is made to enter a photosensitive material 1 at a predetermined incidence angle that is different from the incidence angle of the first object light beam 3, from the side of a second surface 1b that is opposite to the incident side of the first object light beam 3.

As the first object light beam 3 and the first reference light beam 4 are made to enter the photosensitive material 1, the first object light beam 3 and the first reference light beam 4 interfere with each other. Thereafter, the photosensitive material 1 is subjected to a post-treatment to prepare the first hologram 1'.

In an example above, photopolymer was used for green color as the first hologram recording photosensitive material 1 for preparing a Lippmann hologram. A DPSS laser having a wavelength of 532 nm was used for the imaging.

Figure 2:
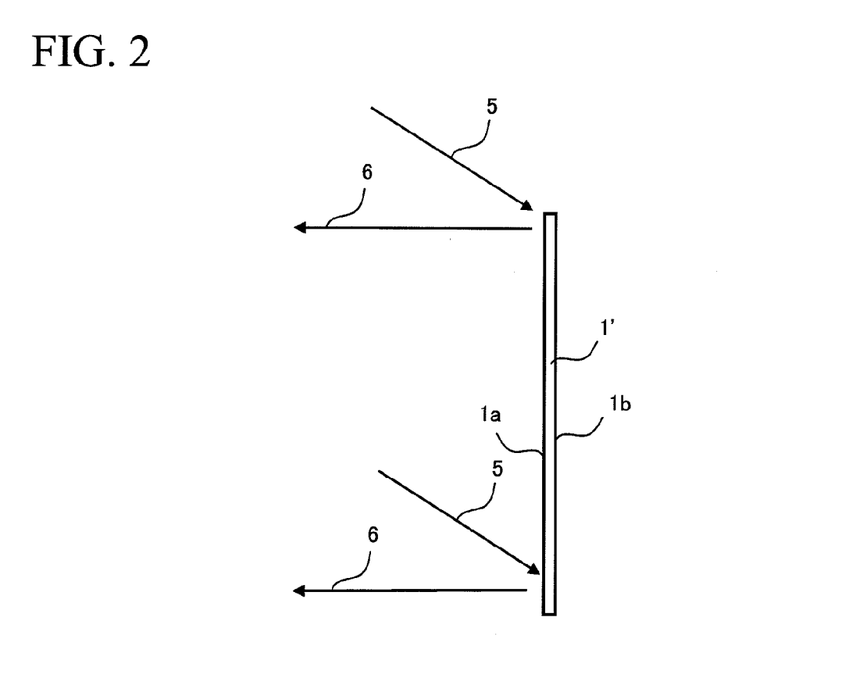
FIG. 2 is a schematic illustration of a method of reproducing a first hologram 1'.

FIG. 2 is a schematic illustration of a step of reproducing the Lippmann hologram. As a first reproduction illumination light beam 5 that includes the first wavelength used at the time of recording and proceeds in a direction opposite to the first reference light beam 4 illustrated in FIG. 1 is made to enter the prepared first hologram 1' from the side of the first surface 1a, the first reproduction light beam 6 that proceeds in a direction opposite to the first object light beam 3 illustrated in FIG. 1 is diffracted and exits from the side of the first surface 1a.

Figure 3:
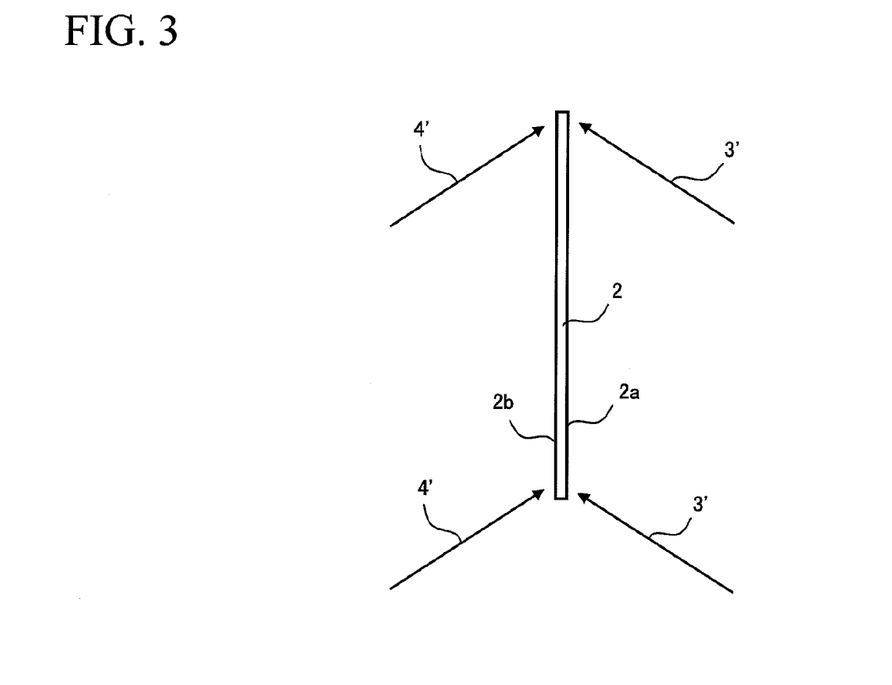
FIG. 3 is a schematic illustration of a method of preparing a second hologram 2'.

FIG. 3 is a schematic illustration of a step of preparing the Lippmann type second hologram 2'. A second object light beam 3' having the first wavelength that represents an incidence angle substantially equal to the incident angle of the first reference light beam 4 of the first hologram 1' and is substantially collimated and a second reference light beam 4' having the first wavelength same as the wavelength used when recording the first hologram 1' that is emitted from a light source same the second object light beam 3' and substantially collimated are made to enter the photosensitive material 2 for recording second hologram 2' respectively from the side of the third surface 2a and from the side of the fourth surface 2b that is opposite to the entering side of the second object light beam 3' and interfere with each other and then the photosensitive material 2 is subjected to a post-treatment to prepare the second hologram 2'.

Figure 4:
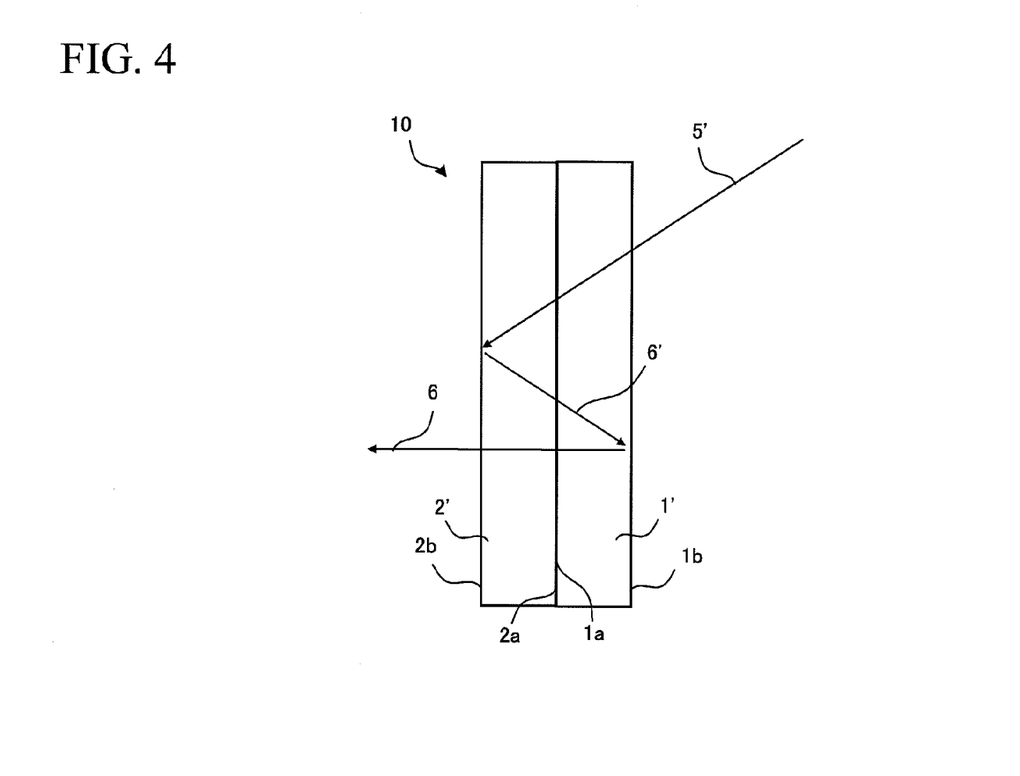
FIG. 4 is a schematic illustration of the configuration of Example 1 of transmission type optical element that is prepared and provided with wavelength selectivity.

FIG. 4 is a schematic illustration of the configuration of Example 1 of transmission type optical element 10 or anti-forgery volume hologram 10 that is prepared and provided with wavelength selectivity, illustrating the configuration thereof. The first surface 1a of the first hologram 1' and the third surface 2a of the second hologram 2' are oppositely arranged in the transmission type optical element 10 or the anti-forgery volume hologram 10.

As the second reproduction illumination light beam 5' having the first wavelength is made to enter the first hologram 1' from the side of the second surface 1b, the second reproduction illumination light beam 5' is transmitted through the first hologram 1' and diffracted in the second hologram 2' to become the second reproduction light beam 6'. Since the exit angle of the second reproduction light beam 6' is designed to be substantially equal to the incidence angle of the reproduction illumination light beam 5 of the first hologram 1', it is diffracted in the first hologram 1' to become the first reproduction light beam 6. Then, the first reproduction light beam 6 is transmitted through the second hologram 2' to go out. While the incidence angle of the first hologram 1' and the exit angle of the second hologram 2' are equal to each other, they may be displaced from each other depending on the hologram material.

As for the diffracting function of the element, the element has a function of operating as a transmission type hologram that diffracts the second reproduction illumination light beam 5' to the direction of the first reproduction light beam 6 and also the wavelength selectivity of a Lippmann hologram.

Figure 5:
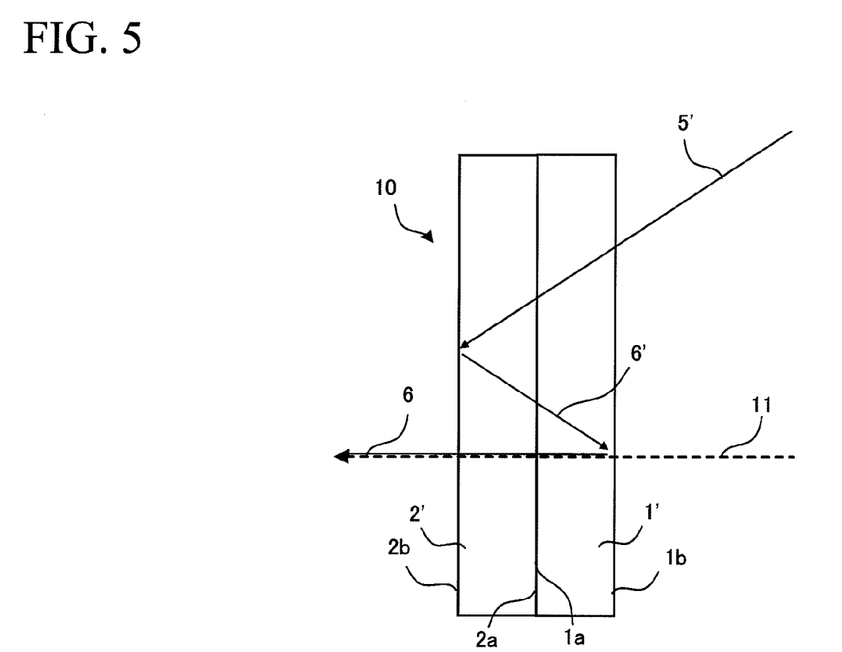
FIG. 5 is a schematic illustration of Example 1 of synthesis of light by a transmission type optical element.

Now, synthesis of light of this embodiment will be described below. FIG. 5 is a schematic illustration of Example 1 of synthesis of light by the transmission type optical element 10.

When a light beam 11 having the second wavelength that is different from the first wavelength is made to enter the first hologram 1' from the side of the second surface 1b at an angle substantially equal to the incidence angle of the first reproduction light beam 6, the light beam 11 of the second wavelength exits at an angle substantially equal to exit angle of the first reproduction light beam 6.

Therefore, as illustrated in FIG. 5, when the second reproduction illumination light beam 5' having the first wavelength is made to enter the first hologram 1' from the side of the second surface 1b and the light beam 11 having the second wavelength that is different from the first wavelength is made to enter the first hologram 1' from the side of the second surface 1b at an angle substantially equal to the incident angle of the first reproduction light beam 6, the second reproduction illumination light beam 5' and the light beam 11 of the second wavelength are synthetically combined and exit at an angle substantially equal to the exit angle of the first reproduction light beam 6.

As for the synthesis of light, when hologram 1' was recorded at 532 nm, a light beam of a wavelength of 647.1 nm emitted from a Kr laser so as to enter the first hologram 1' at an angle substantially equal to the incidence angle of the first reproduction light beam 6 was transmitted without being diffracted to make sure that it can be synthetically combined with a diffracted light beam of 532 nm.

Figure 6:
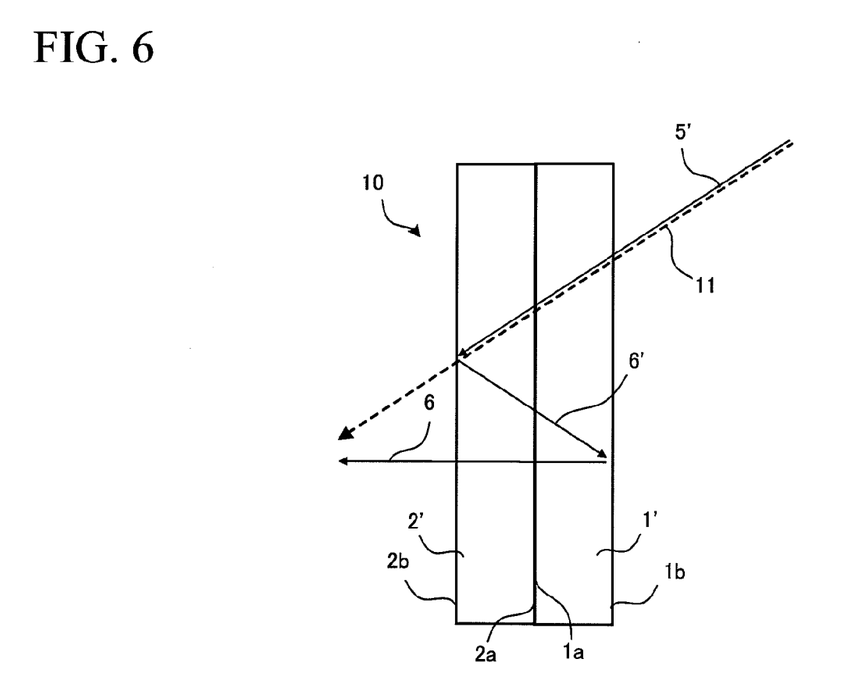
FIG. 6 is a schematic illustration of Example 1 of separation of light by a transmission type optical element.

Now, separation of light of this embodiment will be described below. FIG. 6 is a schematic illustration of Example 1 of separation of light by the transmission type optical element 10.

When a light beam 11 of the second wavelength that is different from the first wavelength is made to enter the first hologram 1' from the side of the second surface 1b at an angle substantially equal to the incident angle of the second reproduction illumination light beam 5', the light beam 11 of the second wavelength is made to exit at an angle same as the exit angle of the light beam of the 0th order of the reproduction illumination light beam 5' and different from the exit angle of the reproduction light beam 6.

Therefore, as illustrated in FIG. 6, when the second reproduction illumination light beam 5' having the first wavelength is made to enter the first hologram 1' from the side of the second surface 1b and the light beam 11 having the second wavelength that is different from the first wavelength is made to enter the first hologram 1' from the side of the second surface 1b at an angle substantially equal to the incident angle of the second reproduction illumination light beam 5', the second reproduction illumination light beam 5' and the light beam 11 of the second wavelength are separated from each other and the second reproduction illumination light beam 5' having the first wavelength is made to exit at an angle substantially equal to the exit angle of the first reproduction light beam 6, while the light beam 11 of the second wavelength is made to exit at an angle substantially equal to the exit angle of the light beam of the 0th order of the second reproduction illumination light beam 5'.

As for separation of light, when hologram 1' was recorded at 532 nm, a light beam of a wavelength of 647.1 nm emitted from a Kr laser so as to enter the first hologram 1' at an angle substantially equal to the incidence angle of the second reproduction illumination light beam 5' was transmitted without being diffracted to make sure that it can be separated from a diffracted light beam of 532 nm.

Figure 7:
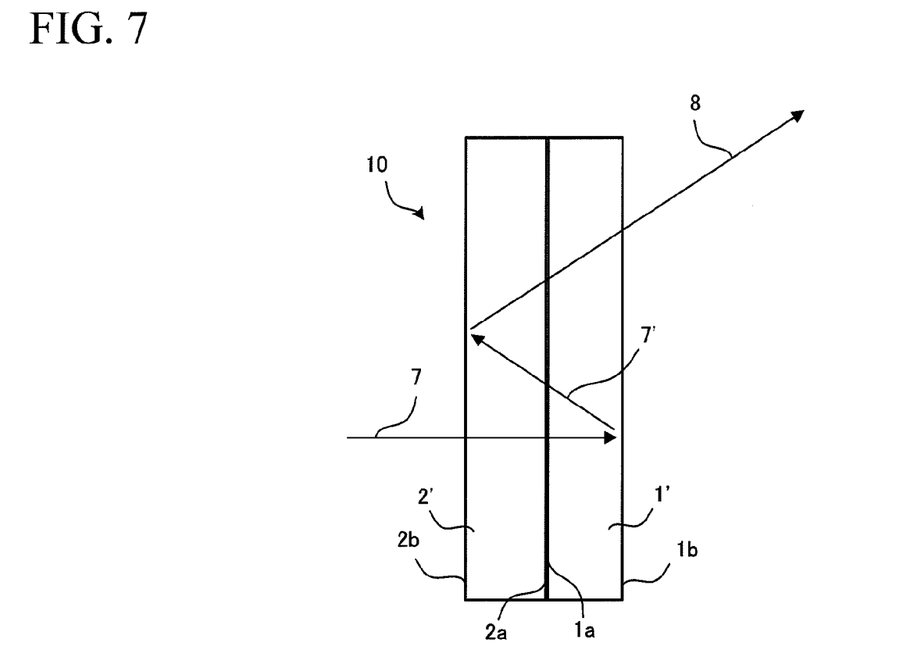
FIG. 7 is a schematic illustration of the configuration of Example 2 of transmission type optical element that is prepared and provided with wavelength selectivity.

A reproduction light beam may be made to enter the transmission type optical element 10 in an opposite direction. FIG. 7 is a schematic illustration of the configuration of Embodiment 2 of transmission type optical element 10 that is prepared and provided with wavelength selectivity, illustrating the configuration thereof.

As a third reproduction illumination light beam 7 that proceeds in a direction opposite to the proceeding direction of the first reproduction light beam 6 is made to enter the second hologram 2' from the side of the fourth surface 2b, the third reproduction illumination light beam 7 is transmitted through the second hologram 2' and diffracted by the first hologram 1' to become the third reproduction light beam 7'. Since the third reproduction light beam 7' proceeds in a direction opposite to the proceeding direction of the reproduction light beam 6' of the second hologram 2', it is diffracted again in the second hologram 2' to become a fourth reproduction light beam 8. Then, the fourth reproduction light beam 8 is transmitted through the first hologram 1' and exits in a direction opposite to the direction of the second reproduction illumination light beam 5'.

Thus, as for the diffracting function of the element, the element has a function of operating as a transmission type hologram that diffracts the third reproduction illumination light beam 7 in the direction of the fourth reproduction light beam 8 and also the wavelength selectivity of a Lippmann hologram.

Figure 8:
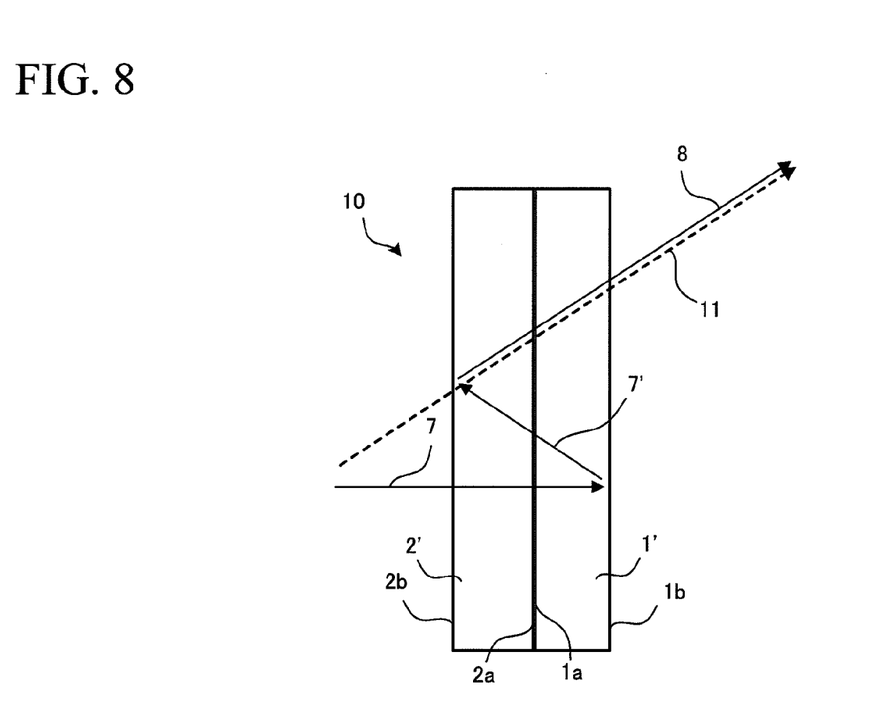
FIG. 8 is a schematic illustration of Example 2 of synthesis of light by a transmission type optical element.

Now, synthesis of light of this embodiment will be described below. FIG. 8 is a schematic illustration of Example 2 of synthesis of light by the transmission type optical element 10.

When a light beam having the second wavelength that is different from the first wavelength is made to enter the second hologram 2' from the side of the fourth surface 2b at an angle substantially equal to the incident angle of the fourth reproduction light beam 8, the light beam 11 of the second wavelength exits at an angle substantially equal to exit angle of the fourth reproduction light beam 8.

Therefore, as illustrated in FIG. 8, when the third reproduction illumination light beam 7 having the first wavelength is made to enter the second hologram 2' from the side of the second surface 2b and the light beam 11 having the second wavelength that is different from the first wavelength is made to enter the second hologram 2' from the side of the fourth surface 2b at an angle substantially equal to the incident angle of the fourth reproduction light beam 8, the third reproduction light beam 7 and the light beam 11 of the second wavelength are synthetically combined and exit at an angle substantially equal to the exit angle of the fourth reproduction light beam 8.

Figure 9:
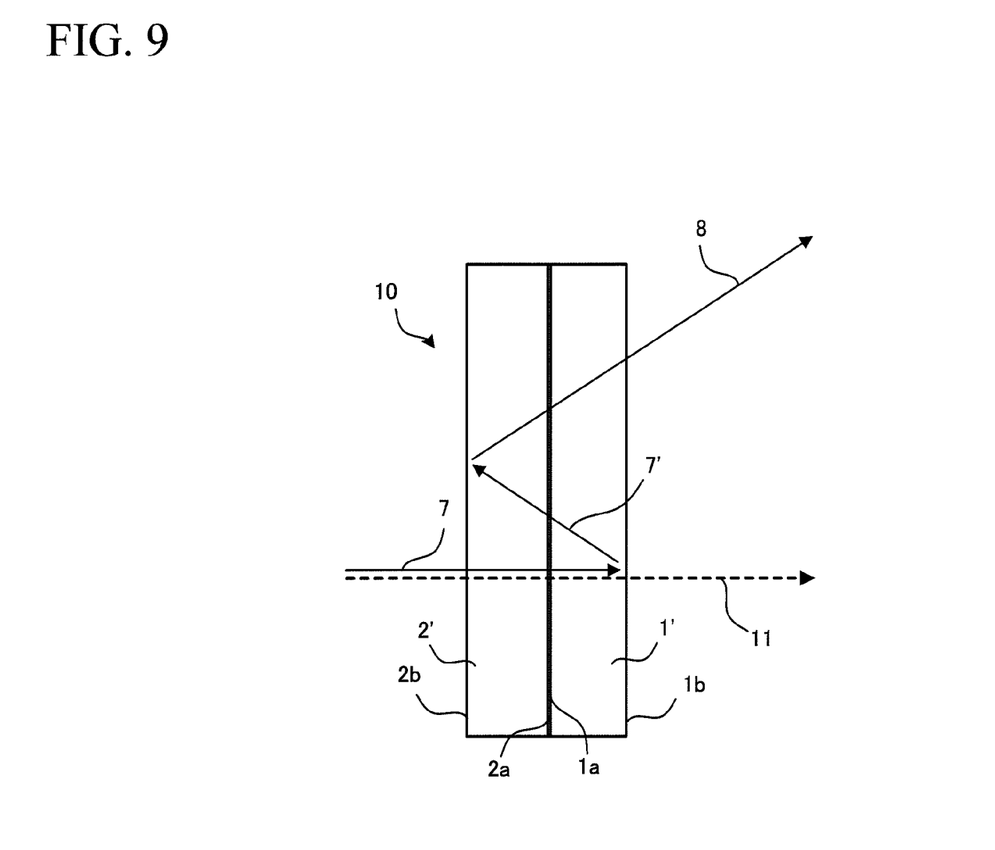
FIG. 9 is a schematic illustration of Example 2 of separation of light by a transmission type optical element.

Now, separation of light of this embodiment will be described below. FIG. 9 is a schematic illustration of Example 2 of separation of light by the transmission type optical element 10.

When a light beam 11 of the second wavelength that is different from the first wavelength is made to enter the second hologram 2' from the side of the fourth surface 2b at an angle substantially equal to the incident angle of the third reproduction illumination light beam 7, the light beam 11 of the second wavelength is made to exit at an angle same as the exit angle of the light beam of the 0th order of the third reproduction illumination light beam 7 and different from the exit angle of the fourth reproduction light beam 8.

Therefore, as illustrated in FIG. 9, when the third reproduction illumination light beam 7 having the first wavelength is made to enter the second hologram 2' from the side of the fourth surface 2b and the light beam 11 having the second wavelength that is different from the first wavelength is made to enter the second hologram 2' from the side of the fourth surface 2b at an angle substantially equal to the incident angle of the third reproduction illumination light beam 7, the third reproduction illumination light beam 7 and the light beam 11 of the second wavelength are separated from each other and the third reproduction illumination light beam 7 having the first wavelength is made to exit at an angle substantially equal to the exit angle of the fourth reproduction light beam 8, while the light beam 11 of the second wavelength is made to exit at an angle substantially equal to the exit angle of the light beam of the 0th order of the third reproduction light beam 7.

Figure 10:
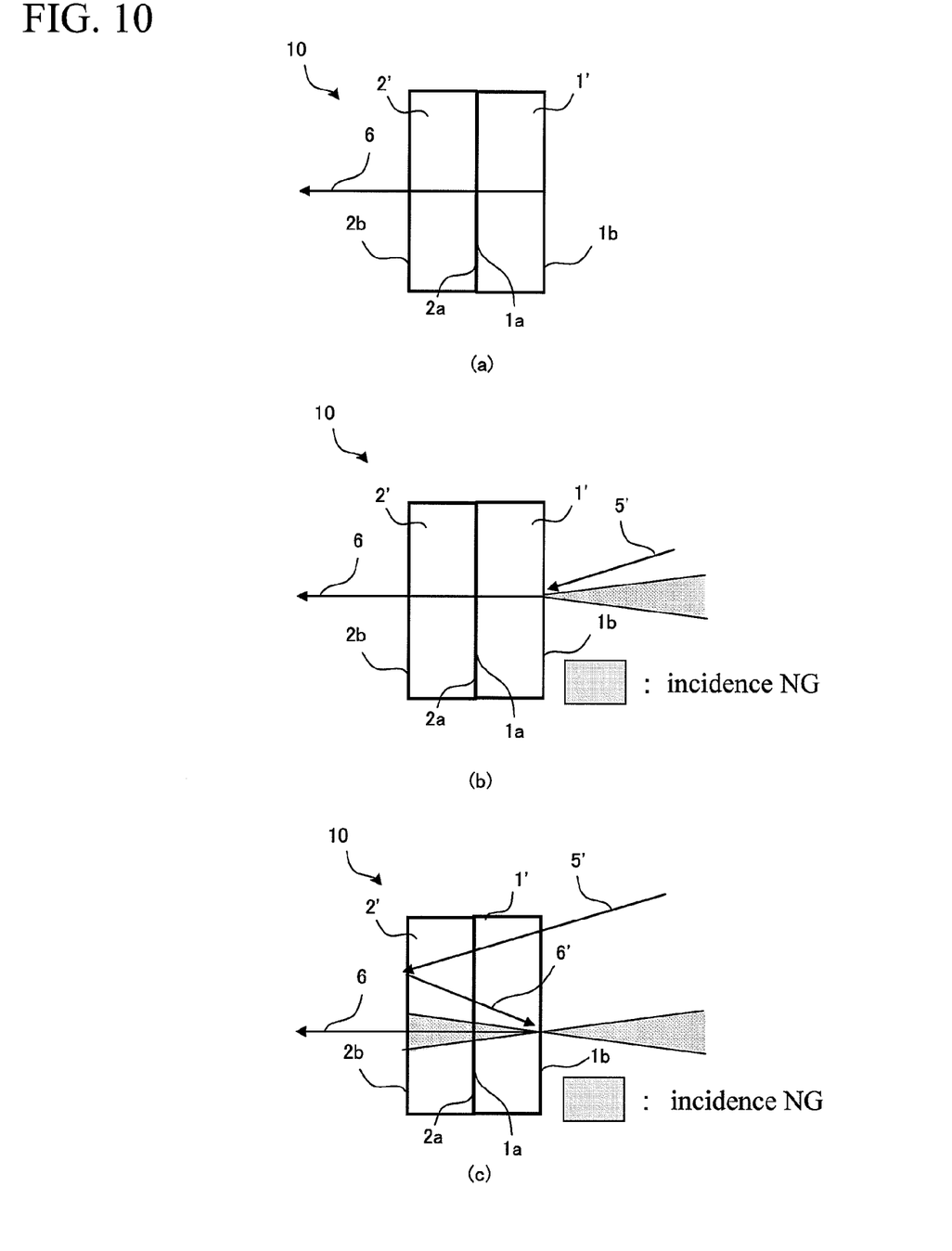
FIGS. 10A to 10C are schematic illustrations of a design method of a transmission type optical element or an anti-forgery volume hologram.

Now, the method of designing the transmission type optical element 10 or the anti-forgery volume hologram 10 of this embodiment will be described below. FIG. 10 is a schematic illustration of the design method of the transmission type optical element 10 or the anti-forgery volume hologram 10.

Firstly, as illustrated in FIG. 10A, the desired ultimate exit angle of this embodiment is determined. Then, as illustrated in FIG. 10B, an incident angle that does not allow the first hologram 1', which is the proximal hologram as viewed from the entering side, to diffract is selected.

Figure 11:
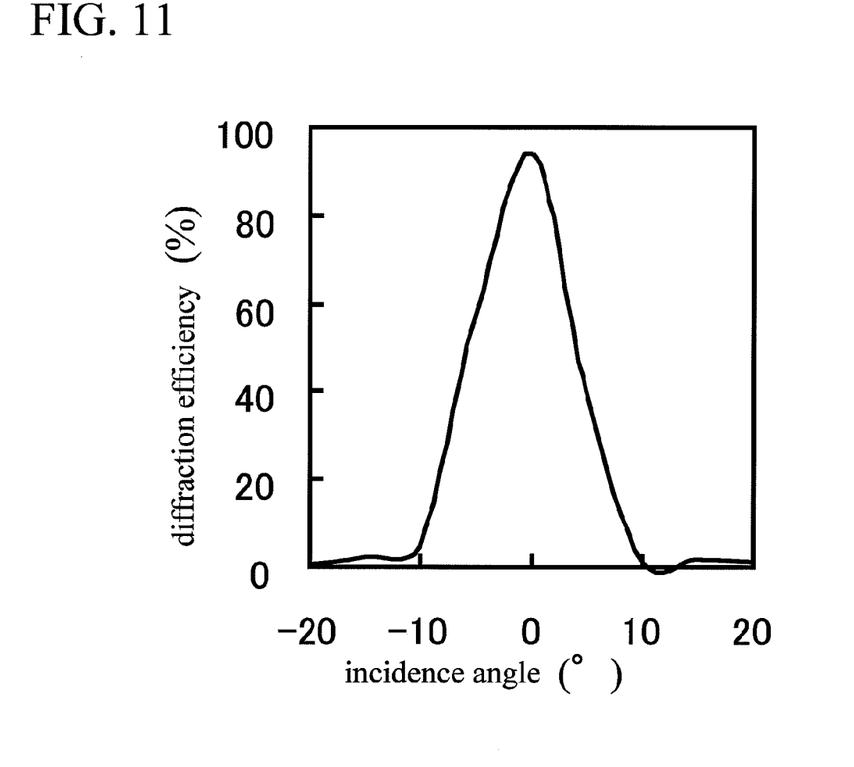
FIG. 11 is a schematic illustration of the incidence angle dependency of the diffraction efficiency when the designed incident angle is made equal to 0°.

FIG. 11 is a schematic illustration of the incident angle dependency of the diffraction efficiency when the designed incident angle is made equal to 0°. As illustrated in FIG. 11, since the first hologram 1' diffracts within a range of ±10° of the designed incident angle, any incident angle that is within the range of ±10° of the desired exit angle of the transmission type optical element 10 is desirably avoided for the incident angle to the first hologram 1'.

Then, as illustrated in FIG. 10C, a reflective angle at which the second hologram 2', which is the distal hologram as viewed from the entering side, does not diffract any outgoing light beam is selected. In this case again, as illustrated in FIG. 11, since the second hologram 2' diffracts within a range of ±10° of the designed incidence angle, any reflective angle that is within the range of ±10° of the desired exit angle of the transmission type optical element 10 is desirably avoided when selecting the reflective angle of the second hologram 2'.

The transmission type optical element 10 that is prepared in this way is compact, not costly and structurally simple but has excellent wavelength selectivity.

Furthermore, the anti-forgery volume hologram 10 prepared in this way provides effects same as those of the transmission type hologram. Additionally, it is compact, not costly and structurally simple but has excellent wavelength selectivity and an excellent anti-forgery effect.

Now, a light synthesis element formed by using such a transmission type optical element 10 will be described below.

Figure 15:
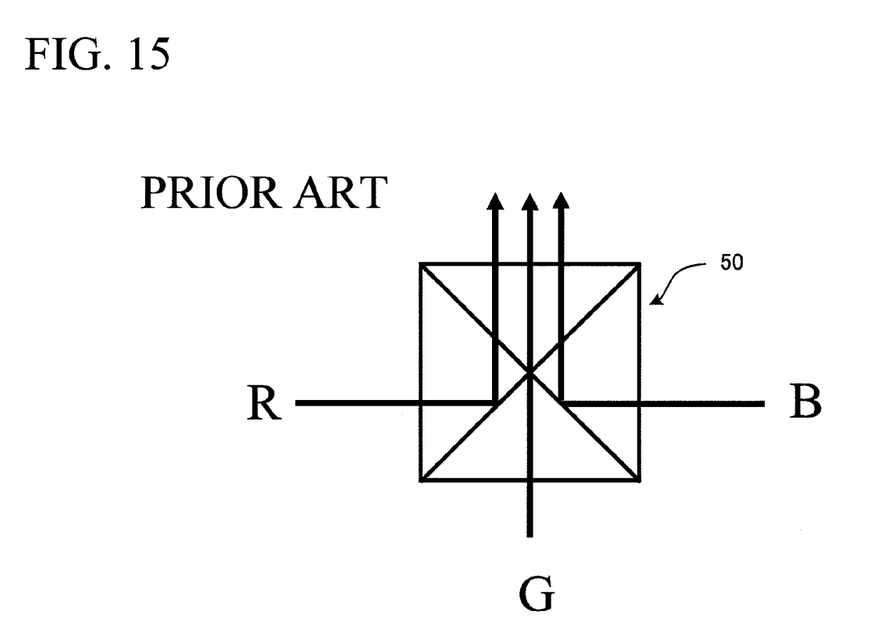
FIG. 15 is a schematic illustration of a known cross dichroic prism 50.

FIG. 15 is a schematic illustration of a known cross dichroic prism 50. As illustrated in FIG. 15, a cross dichroic prism 50 to be used for color synthesis and other applications is an element for synthesizing light elements having wavelengths of RGB. Known cross dichroic prisms require a high degree of angular precision for the rectangular prism surfaces of each prism and hence are costly.

Figure 12:
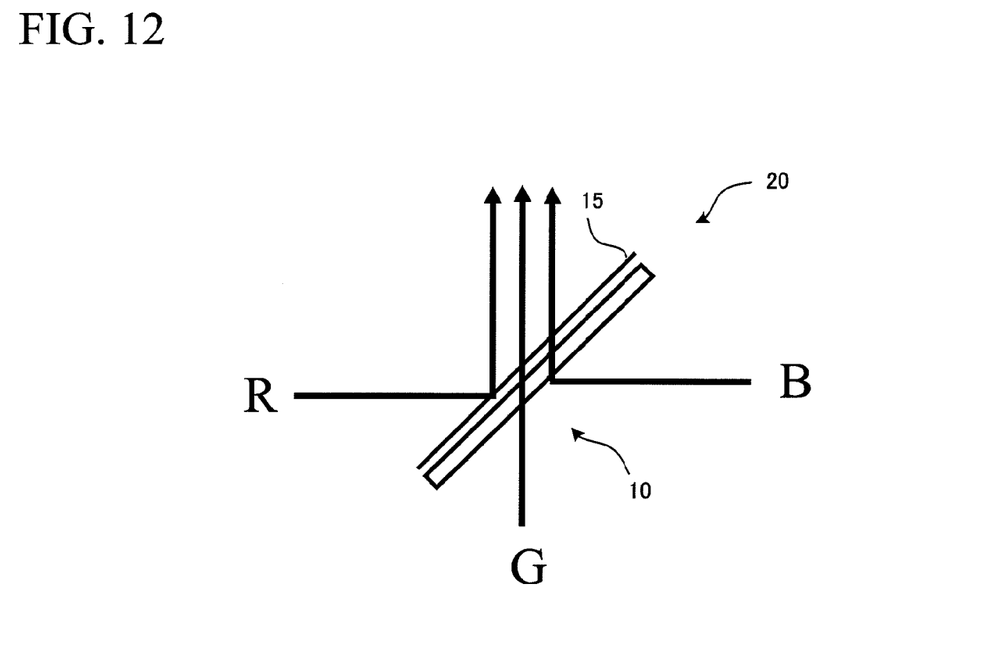
FIG. 12 is a schematic illustration of light synthesis element 20 using a transmission type optical element 10 of an embodiment of the present invention.

FIG. 12 is a schematic illustration of a light synthesis element 20 formed by using this embodiment of a transmission type optical element 10 of the present invention. As illustrated in FIG. 12, the light synthesis element 20 is an element formed by bonding a transmission type optical element 10 of this embodiment and a dichroic mirror 15 for R.

Firstly, the operation of the light synthesis element 20 will be described below. Firstly, the transmission type optical element 10 of this embodiment operates as transmission type optical element for B and the element synthetically combines a light beam having the wavelength of B and a light beam having the wavelength of G. Subsequently, the light beam produced by the transmission type optical element 10 as a result of the synthetic combination is then further synthetically combined with a light beam having the wavelength of R by the dichroic mirror 15 for R. Thus, the light synthesis element 20 can synthetically combine light beams respectively having the wavelengths of R, G and B.

In this way, a light synthesis element 20 formed by using a transmission type optical element 10 of this embodiment can be prepared in a simple manner by bonding the transmission type optical element 10 and a dichroic mirror 15 for R so that it is not costly but lightweight. Note that the wavelengths that are used by the transmission type optical element 10 for synthetic combination are not limited to those of G and B and also the dichroic mirror 15 is not limited to a dichroic mirror for R. In other words, some other element and/or some other dichroic mirror may alternatively be used for the purpose of the present invention.

Next, an attempt of forgery of the anti-forgery volume hologram 10 will be described below.

Figure 13:
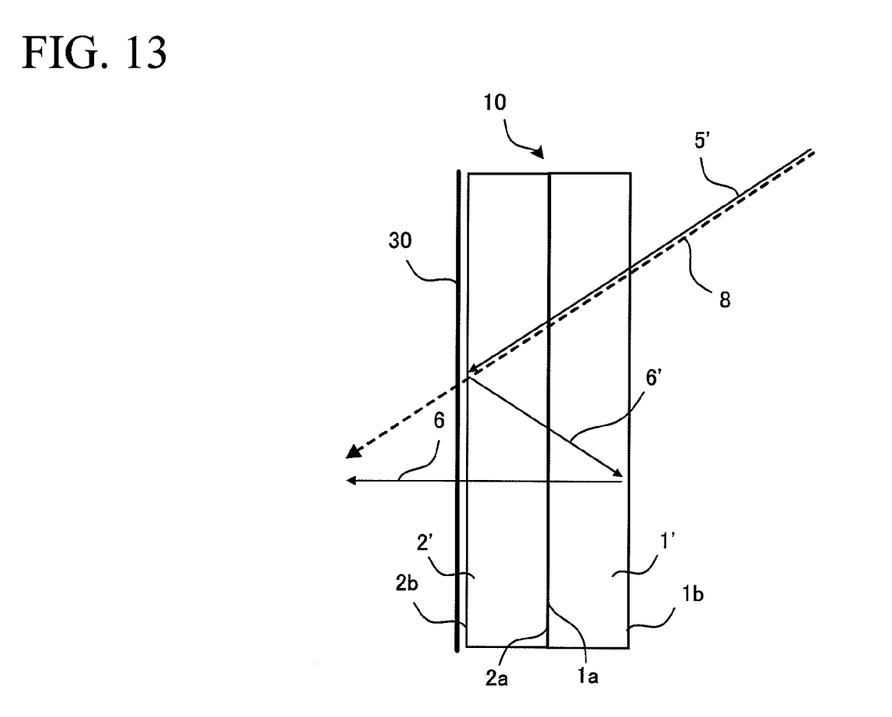
FIG. 13 is a schematic illustration of an attempt of forgery of an anti-forgery volume hologram.

FIG. 13 is a schematic illustration of an attempt of forgery of the above-described anti-forgery volume hologram 10. Referring to FIG. 13, a forged hologram was produced by arranging a photosensitive material 30 for copying at the side of the second hologram 2' of the anti-forgery volume hologram 10 that is opposite to the first hologram 1' and irradiating a reproduction illumination light beam 5' from the side of the first hologram 1'. Interference fringes were produced by the reproduction light beam 6 and the transmitted light beam 8 and recorded in the photosensitive material 30 for forgery.

Thus, man can recognize at a glance the difference between the forged hologram produced in this way that is a transmission type hologram representing color dispersion to a large extent like holograms of the conventional technology and the anti-forgery volume hologram 10 having a high degree of wavelength selectivity.

In the case of a hologram according to the present invention that is recorded with a wavelength of 532 nm, for example, a transmitted and reproduced image of green (at or near 532 nm) can be observed within a range of about ±10° of the designed incident angle. In the case of an ordinary transmission type hologram, a transmitted and reproduced image can be observed within a broader range of incident angle because of a wide color dispersion and reproduced image of the rainbow colors is observed.

While the present invention is described above by way of embodiments of transmission type optical element 10 or anti-forgery volume hologram 10, the present invention is by no means limited by those embodiments, which may be modified in various different ways. For instance, the first hologram 1' or the second hologram 2' may be provided with an adhesive layer and bonded to other materials by means of the adhesive layer.

When an anti-forgery volume hologram according to the present invention is employed for a label, the label may typically be made to have a protection layer/a hologram layer/an adhesive layer and bonded to a desired base material by means of the adhesive layer. When it is employed for a transfer foil, the transfer foil may typically be made to have a protection layer/a hologram layer/a HS layer and bonded to a desired base material by means of the HS layer.

Thus, according to the present invention, it is possible to provide a compact transmission type optical element that is not costly and structurally simple but has excellent wavelength selectivity or a compact anti-forgery volume hologram that is not costly and structurally simple but has excellent wavelength selectivity and is difficult to be forged.

What is claimed is:

1. An optical synthesis element comprising:
   a transmission type optical element including;
   a first hologram having a first surface and a second surface; and
   a second hologram having a third surface and a fourth surface;
   the first surface of the first hologram and the third surface of the second hologram being oppositely disposed so as to make a light beam having a first wavelength
   enter the first hologram from the side of the second surface at an angle that does not allow the first hologram to diffract the light beam having the first wavelength, be transmitted through the first hologram, exit the first hologram from the side of the first surface,
   enter the second hologram from the side of the third surface, be diffracted by the second hologram, exit the second hologram from the side of the third surface at an angle that allows the first hologram to diffract the light beam having the first wavelength,
   enter the first hologram from the side of the first surface, be diffracted by the first hologram, exit the first hologram from the side of the first surface at an angle that does not allow the second hologram to diffract the light beam having the first wavelength,
   enter the second hologram from the side of the third surface, be transmitted through the second hologram and exit the second 30 hologram from the side of the fourth surface; and
   a wavelength selective reflector for selectively reflecting a light beam having a second wavelength different from the first wavelength;
   wherein the transmission type optical element is arranged on the surface of the wavelength selective reflector; and
   the exiting direction of the light beam having the second wavelength and reflected by the wavelength selective reflector and the exiting direction of the light beam having the first wavelength and diffracted by the transmission type optical element are same.

2. The optical synthesis element according to claim 1, wherein
   the optical synthesis element transmits a light beam having a third wavelength that is different from the first wavelength and the second wavelength in the exiting direction of the light beam having the first wavelength and the light beam having the second wavelength without reflection or diffraction.

\* \* \* \* \*